(12) United States Patent
Leizerovich

(10) Patent No.: US 9,467,656 B1
(45) Date of Patent: Oct. 11, 2016

(54) METHOD AND APPARATUS FOR TWO WAY AUDIO COMMUNICATION USING REMOTELY DEPLOYED OBSERVATION DEVICES

(71) Applicant: VSN TECHNOLOGIES, INC., Fort Lauderdale, FL (US)

(72) Inventor: Gustavo Leizerovich, Aventura, FL (US)

(73) Assignee: VSN TECHNOLOGIES, INC., Fort Lauderdale, FL (US)

( * ) Notice: Subject to any disclaimer, the term of this patent is extended or adjusted under 35 U.S.C. 154(b) by 0 days.

(21) Appl. No.: 14/865,021

(22) Filed: Sep. 25, 2015

(51) Int. Cl.
| | |
|---|---|
| H04N 7/14 | (2006.01) |
| H04N 7/15 | (2006.01) |
| H04W 16/00 | (2009.01) |
| H04W 4/00 | (2009.01) |
| H04W 4/02 | (2009.01) |
| G06F 3/16 | (2006.01) |
| H04N 5/232 | (2006.01) |
| G06T 19/00 | (2011.01) |
| H04W 84/12 | (2009.01) |

(52) U.S. Cl.
CPC ............. *H04N 7/152* (2013.01); *G06F 3/16* (2013.01); *G06T 19/003* (2013.01); *G06T 19/006* (2013.01); *H04N 5/23238* (2013.01); *H04W 4/005* (2013.01); *H04W 4/026* (2013.01); *H04W 16/00* (2013.01); *H04W 84/12* (2013.01)

(58) Field of Classification Search
CPC .......... H04N 7/152; H04N 7/15; H04N 7/14; H04N 5/23238; H04W 16/00; H04W 4/05; H04W 4/026; H04W 84/12
USPC ............. 348/14.01–14.16; 455/404.2, 404.1, 455/414.1
See application file for complete search history.

(56) References Cited

U.S. PATENT DOCUMENTS

| | | | |
|---|---|---|---|
| 2014/0094137 A1* | 4/2014 | Gregory | H04W 4/02 455/404.2 |
| 2014/0323104 A1* | 10/2014 | Derrick | G07C 1/20 455/414.1 |

* cited by examiner

*Primary Examiner* — Melur Ramakrishnaiah
(74) *Attorney, Agent, or Firm* — Patents on Demand P.A.; Brian K. Buchheit; Scott M. Garrett

(57) ABSTRACT

A method and apparatus for facilitating audio communication remotely with a person includes the use of several observation devices, each having an audio system that can play audio signals and receive acoustic signals and convert them to audio signals. The audio signals are wirelessly communicated in the region via a wireless local area network, and outside of the region by a wide area network via a gateway device. The audio signals from a command console located remotely from the region are playing in a synchronizations by several of the observation devices such that the resulting acoustic signals combine additively at the location of a person in the region with whom communication is conducted. The observation devices are designed to be deployed on an ad hoc basis to facilitate rapid deployment of the system.

20 Claims, 7 Drawing Sheets

METHOD AND APPARATUS FOR TWO WAY AUDIO COMMUNICATION USING REMOTELY DEPLOYED OBSERVATION DEVICES

FIELD OF THE DISCLOSURE

The present disclosure relates generally to communication systems, and more particularly to two way audio communication systems.

BACKGROUND

There are a variety of activities where, in order to engage in activity, having a remotely located control center with knowledge of the region in which the activity is occurring is beneficial. Furthermore, facilitating audio communication between people in the region and personnel in the control center is desirable. Conventional communications can be facilitated by telephone or two way radio devices, in some situations such conventional means of communication may not be available. For example, the region in which the activity occurs may be geographically remote, where there is no telephony infrastructure. In some cases the desired communication may be with people who are hostile or otherwise not receptive to taking a conventional communication device. In some cases people may enter a controlled area, and communication may be necessary to assess their intent. Furthermore, in some situation, in addition to communication challenges, obtaining layout information of the region can be beneficial. In such scenarios it is not uncommon for personnel to be tasked to a location with, at best, only general layout knowledge. The inability for supervisory personnel located remotely to communicate with people in a region, and provide direction to responders in the region is limited with conventional technology.

Accordingly, there is a need for a method and apparatus for creating an ad hoc two way audio communication system that can be augmented by providing a virtual three dimensional rendering of the region at a command center that is remote from the region.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
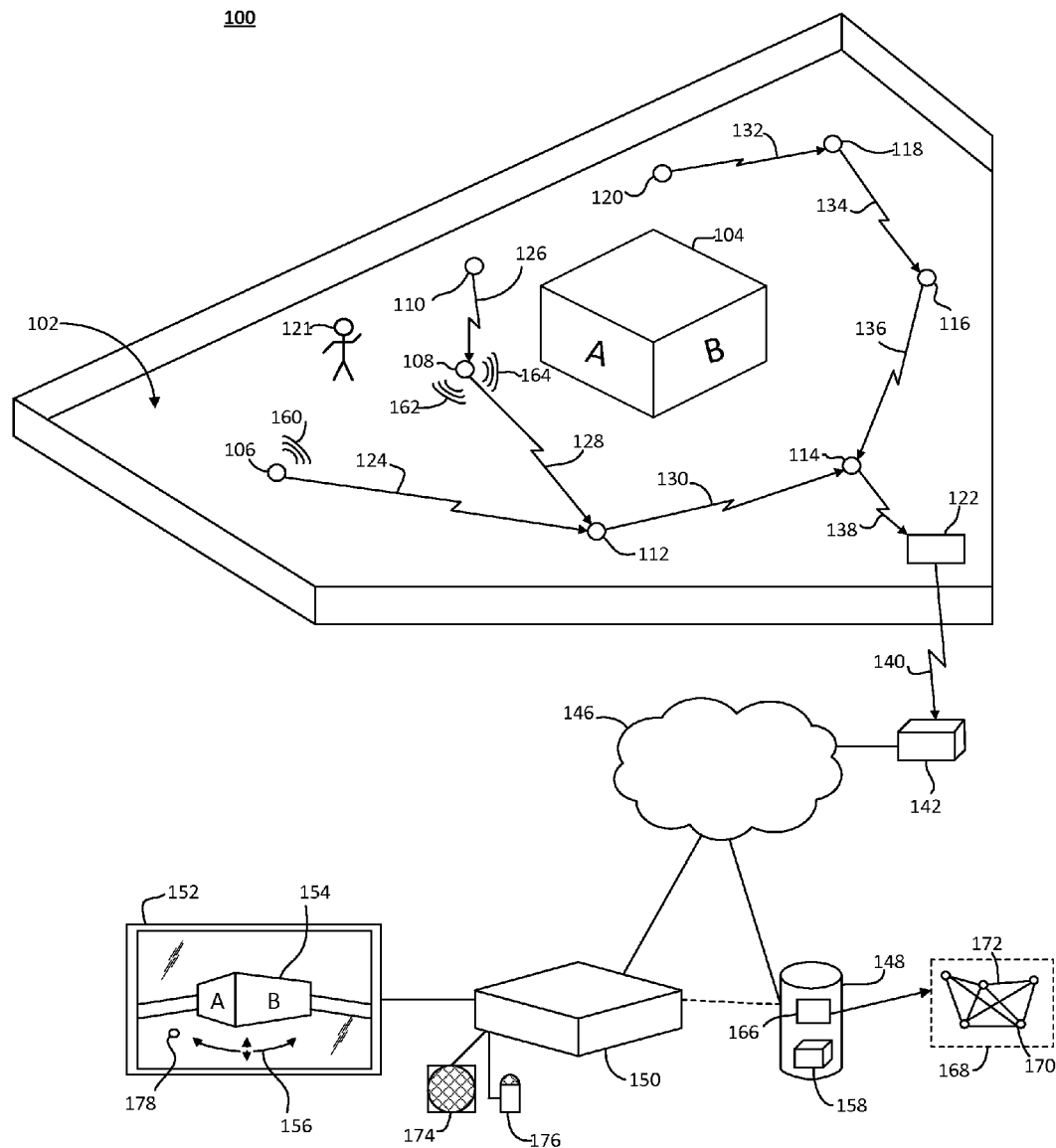
FIG. 1 is a system diagram of a system for a two way audio communication system using remotely deployed observation devices, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. Unless specified as a particular embodiment, it shall be assumed that any of the figures can include, or be used with any embodiment taught in the Detailed Description and any embodiment recited by the claims.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments include a remotely deployed two way audio communication system that includes a plurality of observation devices deployed in, and distributed throughout a region. Each observation device includes a wireless local area transceiver, an audio processor coupled to the wireless local area transceiver, and a microphone and a speaker that are each coupled to the audio processor. Each of the plurality of observation devices are acoustically calibrated for audio magnitude and audio phase with respect to each other, and they form a wireless mesh network where each observation device communicates in the wireless mesh network using its respective wireless local area transceiver operated according to a wireless mesh network protocol. The two way audio communication system further includes a gateway device co-located in the region with the plurality of observation devices that also has a wireless local area transceiver that communicates with the plurality of observation devices through the wireless mesh network. The gateway device also includes a wireless wide area transceiver in communication with a wide area station located remotely from the region. The gateway device communicates audio signals received from the observation devices to the wide area station, and from the wide area station via the wireless wide area transceiver to the plurality of observation devices via the wireless mesh network to be played by at least some of the observation devices to acoustically combine additively at a selected location in the region.

FIG. 1 is a system diagram of a system 100 for a two way audio communication system using remotely deployed observation devices, in accordance with some embodiments. A region 102 can include various features and structures such as, for example, building such as building 104. In the region 102 a plurality of observation devices are deployed, including observation devices 106, 108, 110, 112, 114, 116, 118, 120 (hereafter 106-120). The observation devices 106-120 can be randomly distributed throughout the region 102, such as by tossing them into the region or otherwise being placed in the region 102 on an ad hoc, quasi-random manner. Each observation device 106-120 has its own audio system including one or more speakers and one or more microphones, and each further includes a wireless local transceiver for wireless communications of audio and other signals. In particular, the observation devices transmit information to, and receive information from, a gateway device 122. The gateway device 122 contains a wireless local area transceiver, and also a wireless wide area transceiver to communicate with a wide area station 142 that is outside the region 102, and may be located some distance away, including in orbit over the region 102 in some embodiments. The observation devices 106-120 can each communicate wirelessly with the gateway device 122 directly, or they can communicate using a mesh network protocol in some embodiments.

Each of the observation devices, once deployed, are acoustically calibrated with respect to each other such that each can determine an acoustic phase equalization and difference in audio magnitude from each other observation device 106-120. For example, the gateway device 122 can act as a calibration controller, and cause observation device 108 to play a calibration sound 164 at a specified time. The other observation devices 106, 110-120, which are synchronized in time, receive the calibration sound acoustically using a microphone and measure a phase and audio magnitude of the received calibration sound. Each observation device 106-120 takes a turn playing a calibration sound so that each other observation device 106-120 can calibrate the phase equalization and magnitude. The phase equalization can characterize phase as a function of frequency, where the phase is adjusted to different degrees with respect to the audio frequency. Time shifting a signal, for example, is a linear phase function with respect to frequency, but in some embodiments a scaled, or non-linear phase equalization may be desirable. In some embodiments only the phase equalization may need to be calibrated. In some embodiments the actual delay can be measured and used to adjust the phase equalization in a linear manner as well. As used herein the term "phase" in the context of acoustic calibration, and then playing audio signals by applying the calibration shall be understood to mean phase equalization. Accordingly, "delay" refers specifically to a linear phase equalization, and where delay is not specifically used it shall be understood that other forms of phase equalization can be applied. The audio calibration information may be retained locally by each observation device 106-120, and the audio calibration information for each observation device 106-120 can further be communicated to the gateway device, as well as a command console 150, which is located remotely from the region 102 and is in communication with the gateway device 122 through a wide area network 146 and the wide area station 142.

Generally, a person distributing the observation devices 106-120 will attempt to place them in a manner than avoids clustering them together, but not too far apart that they cannot interact, acoustically. The intent is to allow communication with a person such as person 121 in the region 102, at most or all locations in the region 102, by receiving speech from the person 121 via the microphones of the observation devices 106-120 and routing the resulting audio signals to the command console 150 and playing the audio signals over, for example, a speaker 174. Likewise, speech and other audio can be received at the location of the command console 150 via, for example, a microphone 176, and the resulting audio signal can be played by several of the observation devices 106-120 in a way that they additively combine acoustically at the location of the person 121 to be heard by the person 121 by controlling the phase at which each observation device plays the audio signal. An indication as to the location of the person 121 can be used to derive the phase that each of the several observation devices use to play the audio signal so that the acoustic signals produced by each of the observation devices combine additively at the location of the person 121. The phase and/or magnitude to be used by each of the observation devices 106-120 playing the audio can be derived from the audio calibration data. In some embodiments the location of the person 121 can be inferred based on the sound of the person 121 speaking, as received by several of the observation devices 106-120, and comparing the time of reception with the audio calibration data. In some embodiments the location of the person 121 can be indicated by an input at the command console based on image data produced by the observation devices 106-120 when the observation devices 106-120 include camera systems. Observation devices that are farther from the person 121 will play the sound or audio signal earlier in time than ones closer to the person 121 to allow the acoustic signals of those observation devices located farther away time to propagate closer to the person 121. The phase equalization to each other observation device can simply be reversed for transmission, which can be augmented in some embodiments by considering the delay as well. So, for example, if observation device 106 receives the sound from the person 121 2 milliseconds after it is received at observation device 108 (as determined by appropriate correlation measurement techniques), then observation device 106 can be operated to play an audio signal 2 milliseconds before observation device 108 plays the same audio signal so that the audio signals (e.g. 160, 162) additively combine at the location of person 121. However, if the observation devices are close enough, the phase alone can be controlled to ensure that peaks in wavelength arrive at the intended target at the same time. The location of the person 121 can then be updated automatically or by user input. If the location of the person 121 is inferred based on receiving speech sounds from the person 121 at several of the observation devices In some embodiments the observation devices can further each include a camera system to produce image data of the region 102. Using the image data, the region 102, including person 121, can then be rendered or partially rendered by a machine (e.g. the command console 150) in a virtual three dimensional (3D) environment in substantially real time. The region 102 can include geographic features, structures such as building 104, slopes, hills, etc. The region can be an outdoor or an indoor region, or a combination of the two. To facilitate rendering of the region 102, the plurality of observation devices 106-120 each acquire image data of the view from each respective observation device 106-120. The image data represents digital images formed, for example, at a photo sensor of an observation device 106-120.

The observation devices 106-120 can be deployed on an ad hoc basis, and communicate using a wireless mesh network protocol in some embodiments. For example, observation device 106 can communicate data to observation device 112 via a mesh network transmission 124. Observation device 110 can communicate with observation device 108, and transmit data to observation device 108 via transmission 126. Observation device 108 can communicate data for both itself and observation device 110 to observation device 112 via transmission 128. Observation device 112 transmits its own data, as well as the data of observation devices 106, 108, and 110 to observation device 114 via transmission 130. Likewise, observation devices 116, 118, and 120 transmit their respective data, and that of preceding observation device in the mesh network, via transmissions 136, 134, and 132, respectively. Observation device 114 in the present example is within range of a gateway device 122, which acts as an endpoint of the mesh network, and observation device 114 transmits its data and that of all others it has received to the gateway device 122 via transmission 138. The layout of the observation devices 106-120 shown here is an arbitrary layout. It is expected that the deployment of observation device such as observation devices 106-120 with a region such as region 102 will be somewhat random. Personnel may attempt to locate particular observation devices in specific locations, and distribute the observation devices 106-120 (and others) throughout the region 102 so as to cover the region sufficiently to allow a virtual reproduction of the region along with structures such as building 104 and other features, geographic or man-made, or otherwise through the processing of image data produced by the observation devices 106-120.

The transmissions 124, 126, 128, 130, 132, 134, 136, and 138 can be performed using wireless local area transceivers in the observation devices 106-120 and gateway device 122 which communicate using a wireless mesh network protocol. The mesh network protocol allows short range message relay from one node (i.e. an observation device 106-120) to another. Transmissions 124-138 are messages carried by radio signals in accordance with the wireless mesh network protocol, and can include data for a single node, or the cumulative data. Each message identifies the original sending node that produced the data. The data transmitted by each of the observation devices 106-120 can include an identifier uniquely identifying the particular observation device 106-120 as the source of the data, and can further include audio, timestamp, and image data produced by a camera system of the respective observation device 106-120, as well as location and orientation data for the respective observation device 106-120.

The data produced by each of the observation devices 106-120 reaches the gateway device 122 through the mesh network, or other wireless protocol, and the gateway device communicates 140 with a wide area network station 142 using a wide area network transceiver, which has substantially more range than the local area transceiver used for communicating via the wireless mesh network. The wide area network station 142 can be remotely located from the region 102 by a substantial distance, and can be either terrestrially located or in some embodiments it can be a satellite station in orbit over the region 102. The communication 140 is a radio transmission or transmissions that carries the data produced by each of the observation devices 106-120.

The wide area network station 142 can forward the data through a network 146 to a storage device 148 that is coupled to the command console 150. The command console 150 includes computing equipment that can process the audio and image data, along with the location and orientation data provided by the observation devices 106-120, to create a virtual representation 158 of the region 102. The virtual representation 158 of the region 102 can be rendered, for example, on a graphical display 152 coupled to the command console 150. So, for example, the rendering can show a rendering 154 of the building 104, based on image data and other information provided by the observation devices 106-120. Navigation controls 156 can allow a user to change the rendering perspective so as to simulate movement around the virtual recreation of the region 102 in the display 152. The command console 150 can execute image processing software instruction code that compares image data to recognize structure and features in the image data. The location and orientation information provided by the observation devices 106-120 is used to map out the relative positions of the observation devices 106-120 to aid in comparing the image data produced by the different observation devices 106-120 to aid in the recognition of structure represented in the image data. The rendering of the region can be used by, for example, a supervisor located remotely from the region 102 to assist in directing and guiding personnel in the region 102 through separate radio communication.

In some embodiments, an acoustic map 168 can be stored in the storage device 146, or another storage device coupled to the command console 150, as a data structure 166. The acoustic map 168 can indicate the locations (e.g. location 170) of observation devices 106-120 in the region 102, as well as an acoustic phase parameter (e.g. phase 172) between the observation devices 106-120 as determined by the audio calibration process. The acoustic map 168 can be used as an overlay over the rendered region on display device 152. In some embodiments a user of the command console 150 can indicate a position 178 in the navigable virtual rendering of the region 102 on the display 152. The indicated location 178 can correspond to the location of a person (e.g. person 121) in the region with whom the user at the command console 150 is in communication. The indication of the location can be mapped to a location on acoustic map 168 to select a subgroup of several observation devices to play an audio signal provided at the microphone 176 of the command console 150. Phase or timing information can be derived from the distance to the person from each of the observation devices that will play the audio provided at the command console 150. In some embodiments the gateway device 122 can maintain a set of acoustic calibration data provided by the observation devices 106-120, and forward audio signals to several of the observation devices 106-120 to be played along with a timing indication corresponding to the appropriate phase so that the acoustic signals produced by the several observation devices playing the audio signal(s) additively combine at the indicated location.

Observation devices can be added to the network in the region 102 to augment the virtual rendering of the region 102 as well as to increase the area that is covered for two way audio communication. Upon being added, or upon an observation device being removed, an audio calibration test can be run again to update the audio calibration data. The network, if a mesh network, can update dynamically to adjust to the addition, removal, or location change of observation devices. The resulting changes in the image data can be used to adjust the virtual reconstruction of the region 102. The image processing and rendering device 150, upon generating the virtual reconstruction of the region 102, and store the virtual representation 158 in the storage device 148 along with the data from the observation devices 106-120, or in another data store. The virtual representation 158 can be constructed, for example, using voxels to represent element units of structure that is recognized by the image processing and rendering device 150 upon processing the image data.

Figure 2:
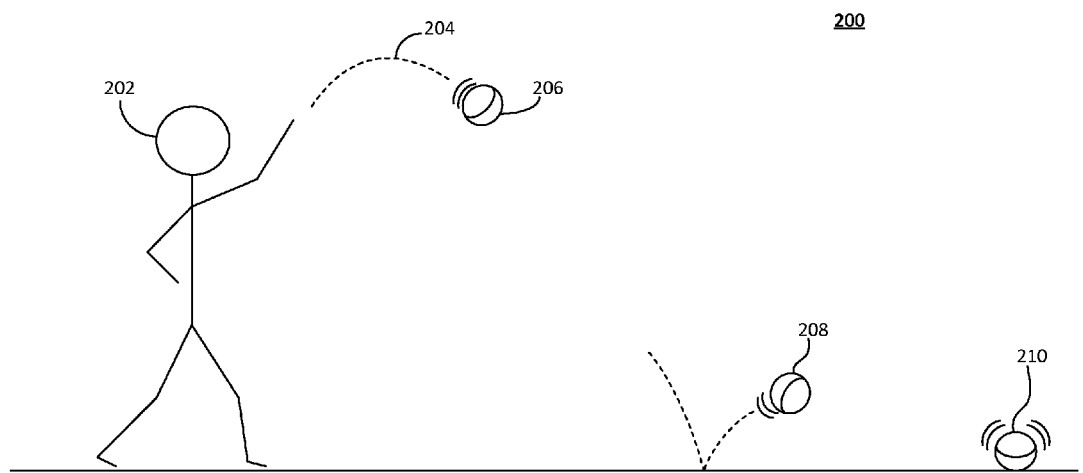
FIG. 2 is a deployment diagram of a method of deploying an observation device, in accordance with some embodiments.

FIG. 2 is a deployment diagram 200 of a method of deploying an observation device, in accordance with some embodiments. Essentially a person 202 can simply toss 204 or drop an observation device, represented here in positions 206, 208, 210. The observation devices can be designed to withstand the mechanical shock that would typically be experienced upon being thrown into a region. Thus in position 206 the observation device is airborne, in position 208 the observation device is bouncing off the ground and still in substantial motion, and in position 210 the observation device has come to rest. The observation device can be substantially spherical, and weighted so as to be self-righting upon coming to rest. In some embodiments the observation device can include extendible probes or legs that can be extended from the body of the observation device to push the observation device into another position if, upon coming to rest, the observation device is unable to self-right itself. Thus, in some embodiments, one or more persons 202 can quickly deploy several observation devices in a region by tossing them into different locations in the region. The persons deploying the observation devices would take care to try and deploy each observation device such that it not substantially blocked, acoustically, and for those observation devices including a camera system, they should be deployed to have a substantial view of the region. In some cases an amount of over-deployment in the number of observation devices deployed can be used on the assumption that at least some observation devices will be, or become blocked, or have an obscured view of the region. Accordingly, the deployment method can allow rapid deployment, and when necessary even covert deployment, of the observation devices. Once deployed, the observation devices can establish the wireless local network and begin communicating with the gateway device, which is deployed at substantially the same time.

Figure 3:
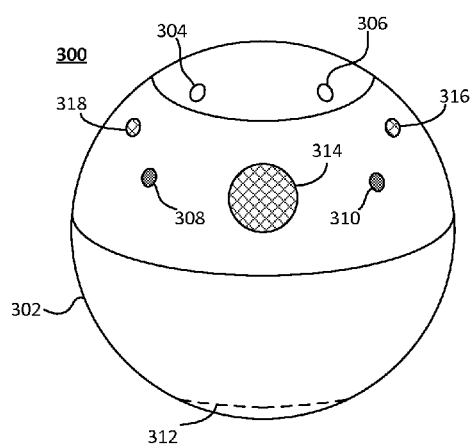
FIG. 3 is a side view of an observation device used in a system including a plurality of such observation devices for facilitating two way audio communication, in accordance with some embodiments.

FIG. 3 is a side elevational view of an observation device 300 used in a system including a plurality of such observation devices for facilitating two way audio communication, in accordance with some embodiments. The observation device 300 can be have a substantially spherical housing 302 which contains the various circuits and components of the observation device 300. The observation device 300 includes an audio system that includes one or more microphones 308, 310, and a speaker 314. The speaker can be a loudspeaker that is designed to produce acoustic signals such that voice can be intelligibly heard by a person of ordinary hearing at a reasonable distance (e.g. on the order of 30 meters). Likewise, the microphones 308, 310 can be high gain microphones to amplify voice sounds produced by people speaking at a similar distance. The observation device 300, as mentioned, contains a wireless local area transceiver over which it can receive audio signals, such as audio signals provided at a remote location such as a remotely located command console. With the audio signals, the observation device can also wirelessly receive timing or phase information indicating the phase at which to play the received audio signal. Accordingly, the observation device can comprises a clock or other time keeping system that is synchronized among the plurality of deployed observation devices (e.g. a GPS clock). Likewise, acoustic signals received via the microphone(s) 308, 310 can be converted to time-encoded audio signals that are transmitted to the gateway device, and comparison of the audio signals received at different observation devices can be performed, either at the gateway device or at the command console.

In some embodiments the observation device 300 can further include a camera system for producing images represented by image data. In some embodiments the camera system can be a panoramic camera system which has a field of view that would require a human viewer to "pan" (i.e. turn) their view to see all that is captured in the panoramic field of view. In some embodiments the panoramic camera system can be a 360 degree camera system that has a 360 degree field of view completely around the observation device 300. In some embodiments, accordingly, the observation device 300 can include multiple cameras such as cameras 304, 306. Cameras 304, 306 can be conventional optical cameras, and the observation device 300 can further include infrared cameras 316, 318, to acquire infrared image data. The cameras 304, 306, 316, 318 can be distributed around a circumference of the housing 302 of the observation device 300 to produce the desired field of view. Images produced by each respective camera 304, 306, 316, 318 can be combined to produce a panoramic image. Separate images can be merged in a process known as "stitching" to join images together into a larger image. Each camera 304, 306, 316, 318 can include a lens system that directs light onto a photo sensor, as is known. To help keep the observation device upright, a weight 312 can be disposed in the bottom of the spherical housing 302. If the observation device 300 is on its side, the weight 312 will bias the observation device 300 to roll towards the weight.

Figure 4:
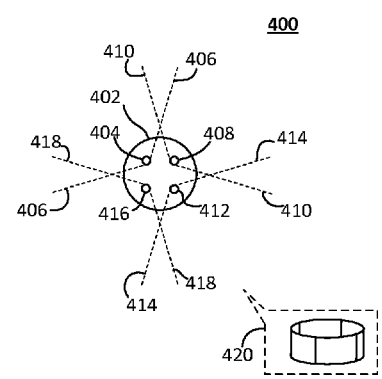
FIG. 4 is a field of view diagram of a camera system of an observation device used to facilitate two way audio communication, in accordance with some embodiments.

FIG. 4 is a field of view 400 diagram of a camera system of an observation device, in accordance with some embodiments. The diagram shows a top plan view of a spherically-shaped observation device 402 having a plurality of cameras 404, 408, 412, and 416. Camera 404 has a field of view bounded by line 406, camera 408 has a field of view bounded by line 410, camera 412 has a field of view bounded by line 414, and camera 416 has a field of view bounded by line 418. The respective fields of view of each camera overlaps that of the two adjacent cameras. Accordingly, images produced by each camera 404, 408, 412, 416 will overlap with that of adjacent cameras. By processing the image data and merging the images at their adjacent overlapping boundaries, such as by stitching, a circular image 420 can be produced from the collective images. The circular image data can be transmitted by the observation device 402 via the wireless mesh network, along with orientation and location information, to facilitate a virtual reconstruction of objects, features, and structure in field of view of the observation device 402. The orientation information can indicate which point in the image data is looking north, for example, as well as a tilt of observation device for cases where the observation device is not perfectly upright. These parameters can be used by the imaging system in construction of a virtual representation of the region.

Figure 5:
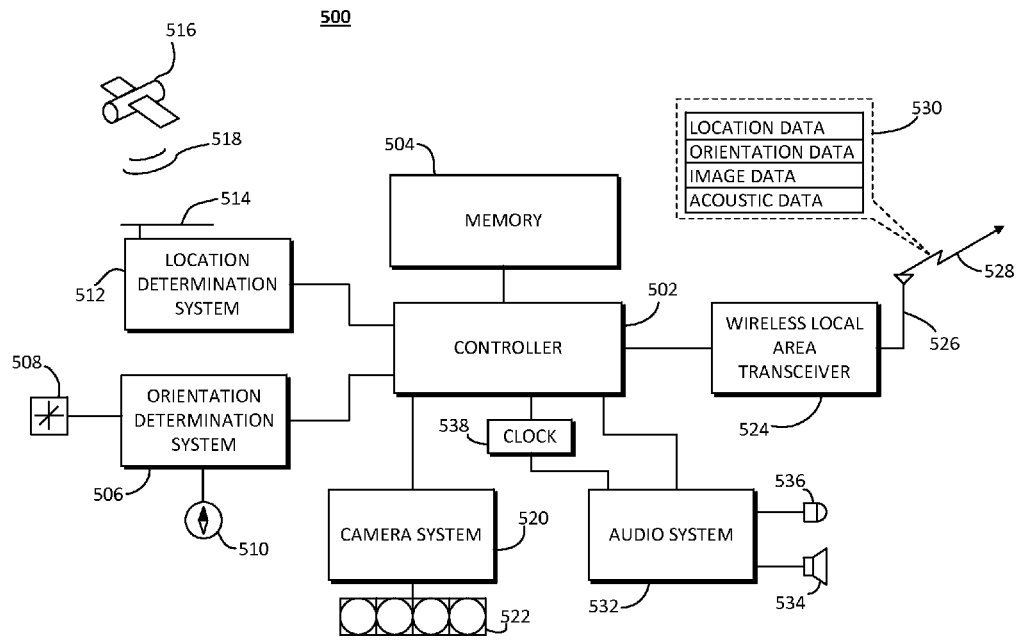
FIG. 5 is a block schematic diagram of an observation device, in accordance with some embodiments.

FIG. 5 is a block schematic diagram of an observation device 500, in accordance with some embodiments. The observation device 500 includes a controller 502 such as a microcontroller or microprocessor that is coupled to memory 504. Memory 504 represent an aggregate memory that can include separately addressable read only memory (ROM), bulk storage memory, random access memory (RAM), and other types of memory. In general the memory 504 includes instruction code stored in non-transitory memory that is executed by the controller 502, either directly from the non-transitory memory or upon being instantiated in RAM, which causes the observation device to carry out various functions and operations, including interfacing with other components of the observation device 500. The controller 502 is coupled to an audio system 532 that includes one or more speakers 534 and one or more microphones 536. The audio system converts audio signals into acoustic signals via the speaker 534, and acoustic signals received at the microphone into audio signals. The audio signals can be in either digital or analog form, and digital audio signals can be encoded for compressions, as is well known (e.g. using voice encoding such as vector sum excited linear predictive coding). The audio system 532 can control the receiving and playing of audio signals in a half-duplex manner to ensure that acoustic signals produced by the speaker 534 do not feed back through the microphone 536. Audio signals, both those to be played and those received via the microphone 536, can be buffered (e.g. at the audio system 532 or in memory 504) until they are either played or transmitted by the observation device. The audio system 532 can be coupled to a clock 538 for both time encoding/stamping of received audio signals, and to play audio signals at specified times. The clock 538 can be synchronized by a clock signal provided by, for example, a location determination system 512, a clock signal provided by the gateway device, or any other means of synchronizing clocks among devices.

In some embodiments, where the observation device 500 generates image data, the observation device 500 can further include an orientation system 506 that determines an orientation of the observation device 500. The orientation includes the rotational alignment of the observation device 500 with regard to geographic references such as, for example, north, as can be determined by an electronic compass 510. The orientation can also include a tilt indication that can be determined by a three axis accelerometer 508. The tilt indicates the angle at which the observation device is tilted with respect to gravity. The observation device further includes a location determination system 512 that can determine a location of the observation device 500. For example, the location determination system can include a satellite positioning receiver that uses an antenna 514 to receive positioning signals 518 from orbiting positioning satellites 516, as is well known.

The observation device 500 further includes a camera system 520 that includes one or more photo or image sensors 522. The image sensors 522 produce images from light received at the image sensors 522 that is focused by respective lenses. The images from each image sensor can be processed locally in the observation device 500 to produce a panoramic image by merging discrete images together using, for example, stitching, as is well known. Alternatively, the image data for each sensor can be transmitted by the observation device 500 and another device can perform image processing.

To receive and transmit data and messages including audio signals and image data, the observation device 500 includes a wireless local area transceiver 524 which can be operated, in some embodiments, according to a wireless mesh network protocol. The wireless mesh network protocol can be implemented on top of a more basic networking protocol, such as, for example, that specified by the Institute of Electrical and Electronic Engineers (IEEE) in their specification 802.11 or 802.15, among other wireless networking protocols. Mesh networking is a peer-based networking scheme were node of the network communicate as peers. The wireless local area transceiver 524 transmits messages 530 in radio signals 528 via an antenna 526. The messages can include location data, orientation data, image data, as well as identification data that identifies the observation device 500. The signals 528 can be encrypted to prevent reception, or transmission in the mesh network, by unauthorized parties. Likewise, the wireless local area transceiver 524 can receive messages from other observation devices that are forwarded by observation device 500 through the mesh network.

Figure 6:
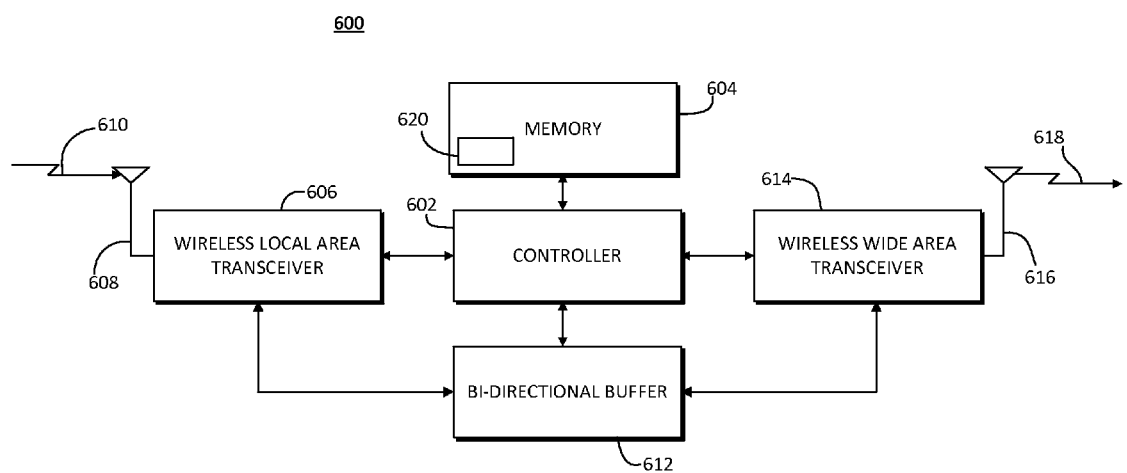
FIG. 6 is a block schematic diagram of a gateway device, in accordance with some embodiments.

FIG. 6 is a block schematic diagram of a gateway device 600, in accordance with some embodiments. The gateway device 600 includes a controller 602 such as a microcontroller or microprocessor that is coupled to memory 604. Memory 604 represents an aggregate memory that can include separately addressable read only memory (ROM), bulk storage memory, random access memory (RAM), and other types of memory. In general the memory 604 includes instruction code stored in non-transitory memory that is executed by the controller 602, either directly from the non-transitory memory or upon being instantiated in RAM, which causes the gateway device 600 to carry out various functions and operations, including interfacing with other components of the gateway device 600. In particular, the gateway device 600, as its name implies, acts as a gateway between the mesh network of observation devices and another network. Accordingly, the gateway device 600 includes a wireless local area transceiver 606 that, using an antenna 608, can receive signals 610 from one or more observation devices or other devices operating the in mesh network. Messages received via the wireless local area transceiver 606 can be buffered in a bi-directional buffer 612. Buffered messages can be removed from the bi-directional buffer 612 and transmitted by a wireless wide area transceiver 614. The wireless wide area transceiver 614 transmits at a substantially higher power than is used for transmission in the mesh network so that the signals 618, transmitted via antenna 616, can reach distantly located access points such as, for example, aircraft, satellites, and remotely located terrestrial receivers. Likewise messages can be received via the wireless wide area transceiver 614 from, for example, the command console. Messages and other data received by the wireless wide area transceiver 614 destined for one or more of the observation devices can be buffered in the bi-directional buffer 612, and then transmitted to one or more of the observation devices via the wireless local area transceiver 606.

When the gateway device 600 receives audio signals that are to be played by several of the observation devices, instruction code such as instruction code 620 can operate the gateway device to determine which of the plurality of deployed observation devices are to receive the audio signals, and then transmit the audio signals to the respective observation devices. In some embodiments, the gateway device can be responsible for determining which of the observation devices should receive the audio signals, based on an indication of a location of an intended listener. In such embodiments the gateway device can use appropriately designed instruction code 620 to determine a time, or a time and an offset for each particular observation device to play the audio signal of the observation devices that receive the audio signal. In some embodiments, the selection of observation devices and respective time offset may be determined at the command console and included in a message transmitted to the gateway device 600 by the command console. The gateway device can then select a base time at which a first observation device plays the audio signal, and other observation devices then commence playing the audio signal at their respective frequency offset (i.e. phase) from the first observation device. In some embodiments, alternatively, the command console determines which of the plurality of observation devices are to play the audio signal, and the respective phase and magnitude for each. The audio signal can be streamed to the gateway device along with the indication of the selected observation devices, and the gateway device 600 can then format messages to the respective observation devices indicating the phase parameter to use to commence playing the audio signal.

Figures 7, 8:
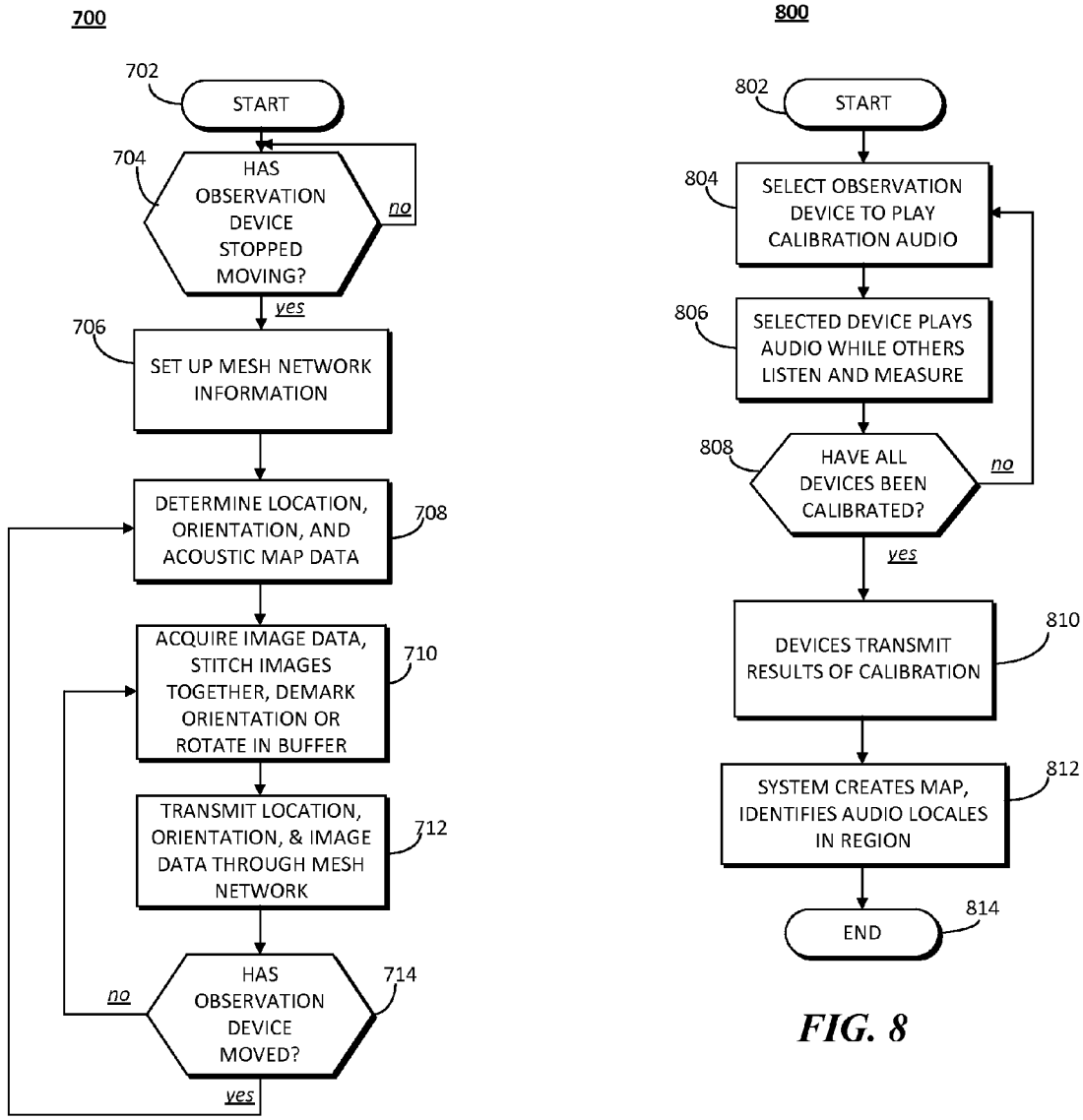
FIG. 7 is a flow chart diagram of a method for deploying and operating an observation device in a mesh network, in accordance with some embodiments.
FIG. 8 is a flow chart diagram of a method for calibrating the acoustic characteristics among a plurality of observation device, in accordance with some embodiments.

FIG. 7 is a flow chart diagram of a method 700 for deploying and operating an observation device in a mesh network, in accordance with some embodiments. In particular the method is for observation devices that include a camera system, location determination system, and orientation system, in addition to an audio system. The camera system, location determination system, and orientation system are used to facilitate the generation of a virtual rendering at the command console to facilitate audio communication between the command console location and a person in the region where the observation devices are deployed.

At the start 702 the observation device is turned on and physically placed somewhere in a region of interest, such as by being dropped or tossed by a person. In step 704 the observation device can determine, such as by a tilt sensor, whether the observation device has stopped moving. The "no" branch out of step 704 indicates the observation device has not stopped moving. When the observation device stops moving it can, in step 706, attempt to communicate with other observation devices or a gateway device as peers, and set up a mesh network. Once the mesh network is set up, each observation device will know to which other peer it will transmit messages. Once the observation device has its mesh network information, it is deployed and can start other operations, such as in step 708 where the observation device determines its location and orientation. In step 710, which can occur concurrently with step 708, or prior to step 708, the observation device acquires image data using the camera system of the observation device. In some embodiments the image data can be panoramic image data, which can be data for a 360 degree image. The observation device can, in some embodiments, merge multiple images together to produce one panoramic image. The orientation of the image data with respect to the geographic orientation of the observation device can be indicated in the image data (e.g. north can be indicated). In step 712 the image, location, and orientation data can be transmitted using the wireless mesh network protocol. In some embodiments the image data, location data, and orientation data can be sent using multiple messages. In some embodiments, image data can be sent separately from location and orientation data, which may only be sent initially and as an update if the observation device moves. In step 714 the method 700 determines whether the observation device has moved, which can be indicated by, for example, either the location determination system of the orientation system. If the observation device has not moved the method returns to step 710 to obtain updated image data. If the observation device has moved, upon the cessation of movement, the observation device returns to step 708 to determine the updated location and orientation.

FIG. 8 is a flow chart diagram of a method 800 for calibrating the acoustic characteristics among a plurality of observation devices, in accordance with some embodiments. At the start 802, the plurality of observation devices are deployed in a region along with the gateway device, and have established a connection to the gateway device using a wireless local area network protocol. Furthermore, the observation devices are synchronized in time so that they can each play a given sound or audio signal beginning at a specified time relative to the other observation devices. As a result, the gateway device will have a record of all of the observation devices in the wireless local area network, and can commence the calibration procedure by commanding each observation device to play a calibration sound at a selected time and magnitude while the other observation devices note the time at which they received the sound and the magnitude of the sound. Thus, in step 804 one observation device is selected to play a calibration sound. The calibration can be a sound that is audible to humans or it can be an ultrasonic sound to avoid alerting people in the region to the presence of the observation devices. In step 806 the selected observation device plays the calibration sound, which can be simply a short "chirp" at a selected frequency.

The calibration sound is played at a selected time, and the other observation devices listen and record the phase difference and magnitude and associates an identity of the observation device playing the calibration sound with the phase and magnitude measurements. In step 808 the gateway device can determine whether all of the observation devices have been calibrated, and if not, the method 800 returns to step 804 where a next observation device is selected for calibration and steps 804, 806, 808 are repeated. In step 810 the results of the calibrations can be transmitted to the gateway device. In some embodiments step 810 can occur inside the loop of steps 804-808, with the results of each calibration being sent prior to commencing calibration of the next observation device. The calibration results can stored at the gateway device, and they can be forwarded to the command console for use at the command console in determining acoustic phase and magnitude of various observation devices in playing an audio signal to additively combine at a selected location for audio communication with a person or persons at the selected location. In step 812 the system can create an acoustic map that indicates the acoustic proximity of the observation devices with respect to each other.

Given the randomness of the deployment of observation devices, there may be audio locales in the region were groups of observation devices are substantially isolated from other observation devices, acoustically. For example, several observation devices deployed on one side of a building can be acoustically isolated from observation devices deployed on the other side of the building. These audio locales can be determined from the calibration data where, for example, several observation devices fail to detect the calibration sound played by another observation device. Such locales can provide natural groupings of observation devices for audio communication in their vicinity. Once the calibration has been performed and the results recorded, the method 800 can end 814. If any observation devices are added to the region, moved in, or removed from the region, the method 800 can be repeated to recalibrate the deployment of the observation devices.

In some embodiments, however, acoustic calibration of the observation devices with respect to each other can be instead based on the location of the person with whom communication is to be conducted. The observation devices can be time synchronized, and upon the person speaking, they can each sample the speech of the person in the region or other sounds and mark the time of reception. These samples can be compared by, for example, the gateway device, to determine which observation device is closest to the person. A correlation procedure can be run on the samples to align them, and then the time demarcations of each observation device can be used to determine their relative distance from the source of the sound. Observation devices that are father will receive the same sound at a later time. Then, when an audio signal is to be played by the observation devices, the offset has already been determined based on the time of reception. The observation device farthest from the person will commence playing the audio signal first, while the observation closest to the person will commence playing the audio signal last, at an offset equal to the time offset between the time of reception for the closest observation device and the time of reception for the farthest observation device. The other observation devices' time offset can be determined by reverse interpolation.

Figure 9:
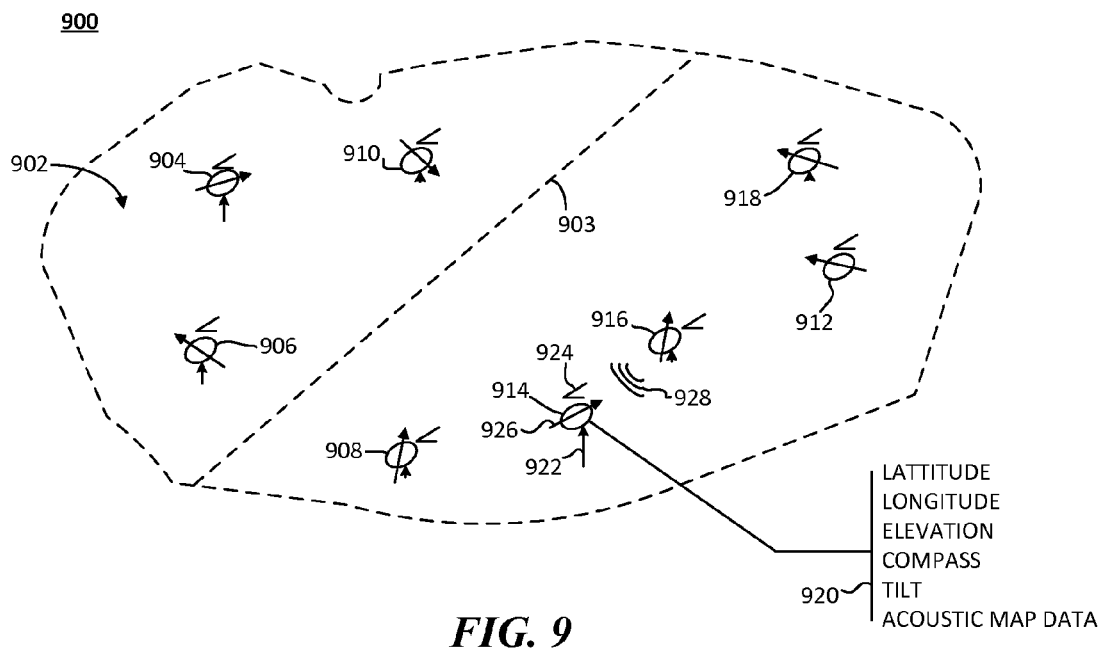
FIG. 9 is a deployment diagram showing a representation of the data for each of a plurality of deployed observation devices in a region, in accordance with some embodiments.

FIG. 9 is a deployment diagram 900 showing a representation of the data for each of a plurality of deployed observation devices in a region 902, in accordance with some embodiments. The region 902 as shown here is a virtual representation of a region in which a plurality of observation devices are deployed. The observation devices 904-918 are deployed throughout the region 902, each having a different location, and each having a particular orientation (represented graphically here). For example, observation device 914 is shown having information 920 including its location (i.e. latitude, longitude, and elevation 922), orientation (compass heading 926, and tilt 924), and audio calibration data. This information is used by the communication system to facilitate audio communication with persons in the region, and to process the image data provided by each of the observation devices 904-918 to create a virtual representation of region 902 including the topography and structures in the region 902. The virtual representation can allow a user at a remotely located position (e.g. the command console) to specify a point or location in the region via a navigable rendering of a virtual representation of the region. By interpolating acoustic calibration data, and knowing the locations of the observation devices in the region, a communication solution can be worked out such that the audio signal (e.g. voice communication) provided at the command console or other remote source can be played by multiple observation devices in a way that their respective acoustic signals additively combine at the specified or selected location.

Figure 10:
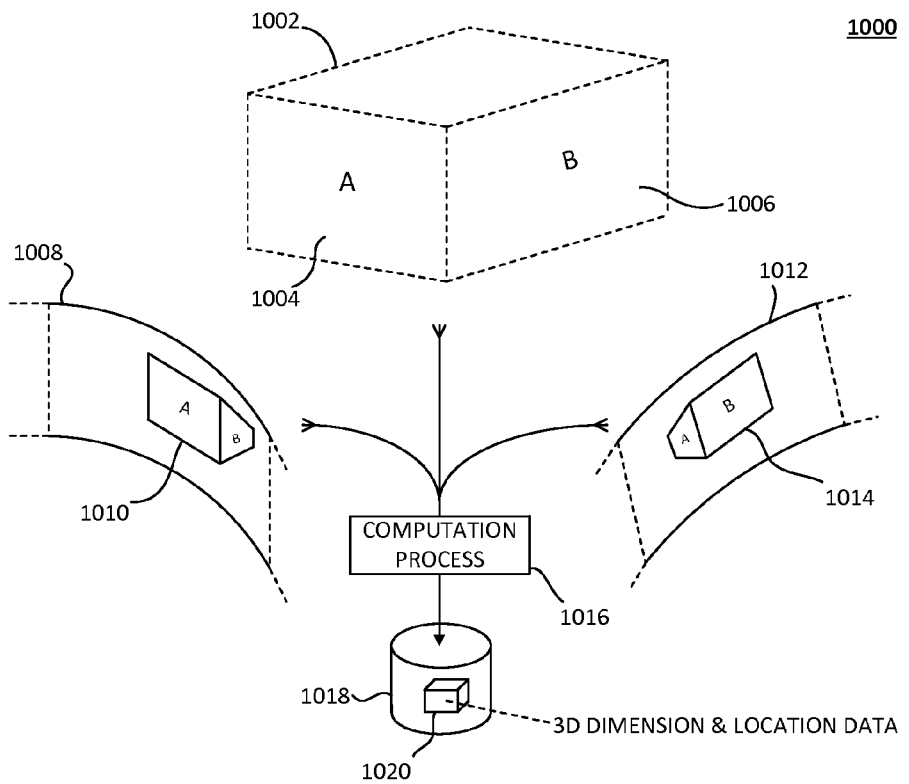
FIG. 10 is a processing diagram for processing image data to construct a three dimensional rending of a region, in accordance with some embodiments.

FIG. 10 is a processing diagram 1000 for processing image data to construct a three dimensional rending of a region, in accordance with some embodiments. In particular, a building 1002 can exist the region, having a first side 1004 (labelled with the letter "A"), and a second side 1006 (labelled with the letter "B"). A first observation device provides a first field of view 1008 which includes a first view 1010 of the building 1002. In the first view 1010, because of the location of the observation device relative to the building 1002, the first side 1004 is prominent in the first view 1010. Similarly, a second observation device provides a second field of view 1012 which includes a second view 1014 of the building 1002. In the second view 1014, because of the location of the second observation device relative to the building 1002, the second side 1006 is prominent in the second view 1014. The image data for the fields of view 1008, 1012 is processed 1016 by the imaging system to create a virtual representation 1020 of the building that is stored as part of the virtual representation of the region in which the observation devices are deployed. The virtual representation includes data that allows it to be rendered from different viewpoints, such as by using navigational controls in a viewing application that rendered the region.

Figures 11, 12:
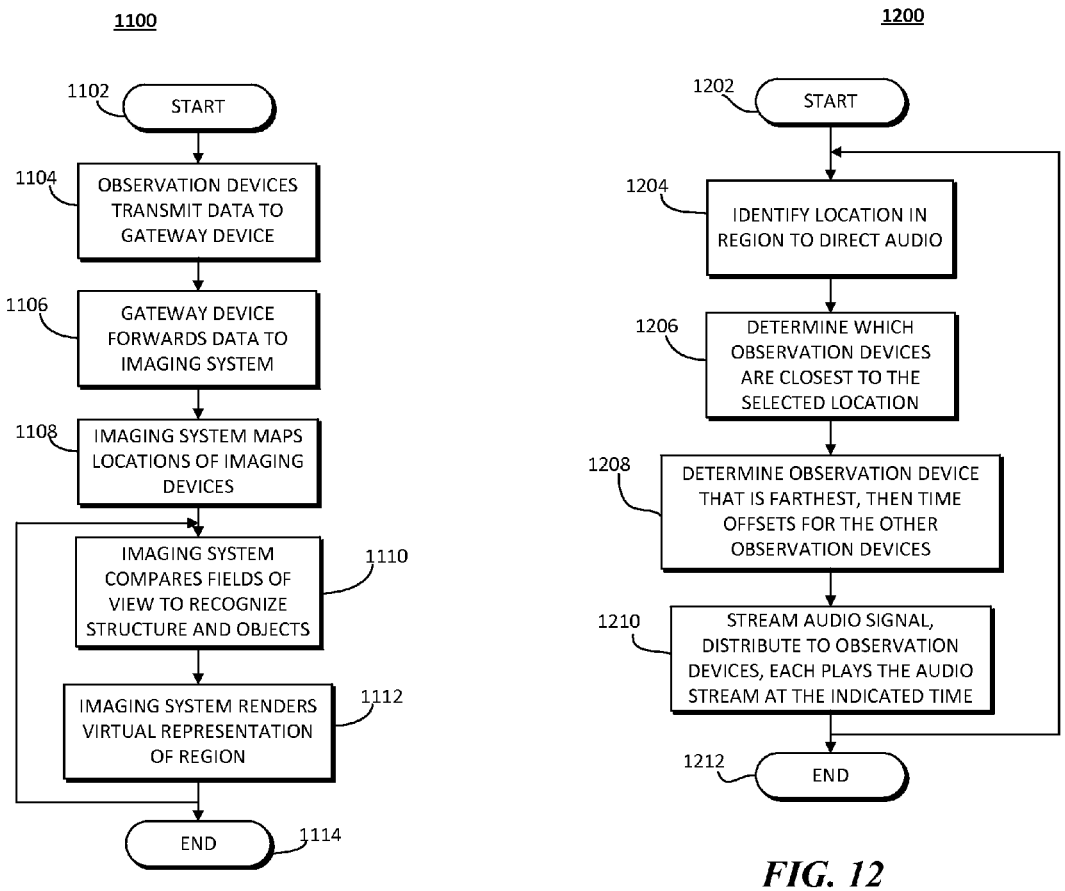
FIG. 11 is a flow chart diagram of a method for transmitting image data from a region and rendering a three dimensional representation of the region based on the image data, in accordance with some embodiments.
FIG. 12 is a flow chart diagram of a method for selecting a group of several observation devices to play an audio signal, and a time offset for each observation device so that the acoustic signals combine additively at a selected location, in accordance with some embodiments.

FIG. 11 is a flow chart diagram of a method 1100 for transmitting image data from a region and rendering a three dimensional representation of the region based on the image data, in accordance with some embodiments. The method 1100 is performed by the system of observation devices, gateway device, and an imaging system that creates and graphically renders a virtual representation of the region in which the observation devices have been deployed. Accordingly, at the start 1102, the observation devices have been deployed in a region of interest and have established a mesh network that directs the observation devices to transmit their respective data a gateway device in step 1104. Several gateway devices can be deployed, resulting in their being several mesh networks of observation devices deployed in the region. In step 1106 the gateway device forwards data to the imaging system via a wide area network link to a remotely located station (e.g. aircraft, satellite, terrestrial station), which can communicate data through a wide area network to the imaging system. In step 1108 the imaging system, upon receiving the data from the observation devices, maps the locations the observation devices in the region. If the region is an outdoor region, the imaging system can start with a topographic overlay, if known, on which to map the locations of the observation devices. At each location the imagine system notes the orientation of the observation device in order to process the image data with the image data of other observation devices in order to recognize structure in the fields of view of the observation devices. In step 1110 the imaging system processes the image data to identify features and structure in the image data. In some embodiments this process can be performed by considering the image data of each observation device individually, but in order to achieve a frame of reference for three dimensional rendering, the imaging system can compare the fields of view in the image data provided by the observation devices with overlapping fields of view (i.e. showing common structure) to identify structure. Whether the fields of view of different observation devices overlap can be determined by their location and orientation. The optical properties of the camera system used by the observation devices, as well as any processing performed on the image date by the observation devices prior to transmitting the image data, can be known to the imaging system and taken into account when processing the image data to recognize structure to create the virtual three dimensional representation of the region. That is, for example, knowing the location of two different observation devices and their orientations, the imaging system can deduce that the two observation devices have an overlapping field of view, but from different perspectives. By using triangulation techniques the imaging system can determine the location and size of structure commonly shown in the image data of two observation device based on their location, taking into account the optical characteristics of the camera system used by the observation devices. In step 1112 the imaging system can render the virtual three dimensional representation of the region. The method 1100 can either end 1114 or continue by repeating steps, particularly steps 1110-1112. However, if the imaging system determines that one or more of the observation devices has moved, or if additional observation devices have been deployed in the region, or removed from the region, step 1108 can also be repeated.

FIG. 12 is a flow chart diagram of a method 1200 for selecting a group of several observation devices to play an audio signal, and determine a phase equalization value for each observation device relative to the other observation devices so that the acoustic signals resulting from playing audio signals at the observation devices combine additively at a selected location, in accordance with some embodiments. At the start 1202 the system is powered up, and the observation devices may be acoustically calibrated with respect to each other, either by each observation device playing a sound and the other deployed observation devices noting the phase of reception and magnitude of the sound, or by simply noting the time phase of reception of a sound made by a person in the vicinity of the observation devices with whom personnel located remotely wish to communicate. In step 1204 the location can be identified to which the audio signal is to be directed. The location can be determined, for example, based on a location input at the command console (e.g. selecting a location in the navigable virtual rendering of the region), or based on receiving speech or other sound at one or more of the observation devices. In step 1206 the method 1200 determines which of observation devices are within an acoustical distance of the selected or determined location. The acoustical distance refers to the distance at which an observation device can be heard when the observation device is playing an audio signal at its maximum volume. Thus, a subset of the plurality of observation devices can be selected that are sufficiently near the person in the region with whom communication is to be conducted. In step 1208 the observation device of the subset selected in step 1206 that is farthest from the selected location is determined for the baseline time as it will begin playing the audio signal or signals first, then the others in the subset will play the same audio signal(s) at an offset based on their distance to the selected location so that the sound produced by each observation device arrives at the location at the same time. In step 1210 the audio signal is streamed to the subset of observation devices from the command console, and via the gateway device which can indicate a respective magnitude and phase adjustment or parameter to be used by each respective observation device in playing the audio signal. The phase parameter can be applied to the dominant frequency of the audio signal at any given instant. Since the audio signal can include human voice, which has a spectrum of frequency content, a dominant frequency can be identified and a phase adjustment corresponding to the phase parameter indicated by the gateway device is applied by the particular observation device playing the audio signal. A portion of the audio stream can be buffered at each observation device to ensure continuous playing of the audio signal. Once the audio signal is played, the method can end 1212, or repeat for a next audio signal. Some or all of the steps 1204-1210 can be repeated, depending on whether the location at which the acoustic signals are to additively combine has moved or not.

Figure 13:
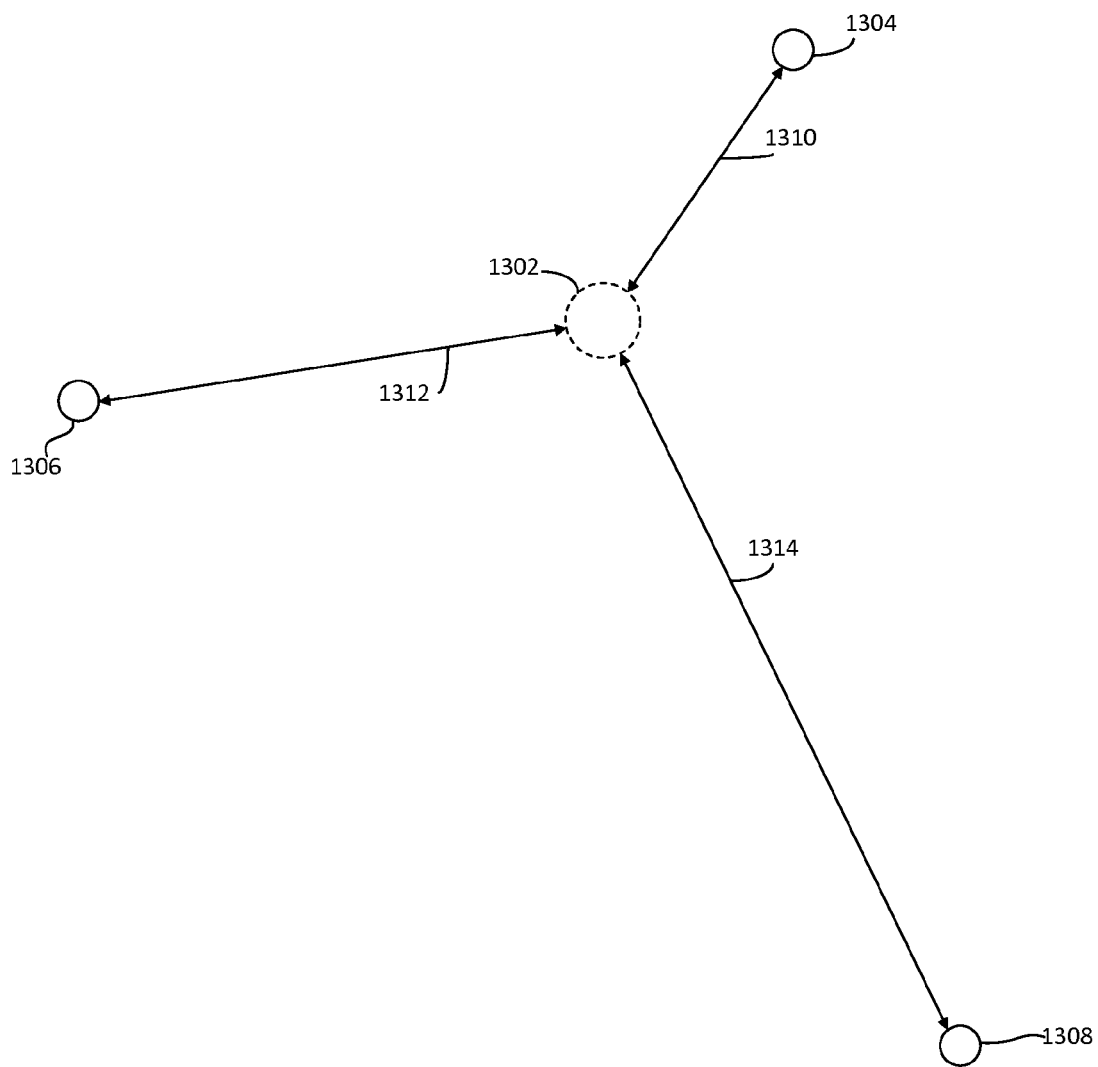
FIG. 13 is an acoustic diagram illustrating how the offset for playing an audio signal for each of several observation devices can be determined, in accordance with some embodiments.

FIG. 13 is an acoustic diagram 1300 illustrating how the phase for playing an audio signal for each of several observation devices can be determined, in accordance with some embodiments. A location 1302 can be selected either as an input at the command console, or by receiving a sound from a person at location 1302 at several observation devices 1304-1308. Each of the observation devices 1304-1308 has a synchronized clock, and can time stamp received sounds in some embodiments. Observation device 1304 is closest to the location at a distance 1310, observation device 1306 is next closest at distance 1312, and observation device 1308 is farthest from location 1302 at distance 1314. Accordingly, a sound from location 1302 will reach observation device 1304 first, then observation device 1306, and then observation device 1308. The phase of reception can be determined by comparing a sample of the sound captured at each of the observation devices 1304-1308 using, for example, cross-correlation or auto-correlation signal processing, which can be performed by the gateway device or the command console. Alternatively, in some embodiments, the locations of the observation devices 1304-1308 are known in terms of geographic coordinates, and their distance to the location 1302 can therefore be calculated. Given the propagation speed of sound, it is a trivial task to determine the time offsets for observation devices 1304 and 1306; observation device 1308 will commence playing the audio signal first since it is farthest away. Then at a first phase offset after observation device 1308 commences playing the audio signal, observation device 1306 will commence playing the audio signal, and then at a second phase offset after the first time offset observation device 1304 commences playing the audio signal. As a result, the acoustic signal produced by each of the observation devices 1304-1308 arrive at the location 1302 substantially in phase to additively combine.

Accordingly, the embodiments taught herein provide the benefit of facilitating communication with people in a region remotely from a command center or command console. By combining the acoustic signals of several observation devices additively by coordinating the playing of the corresponding audio signals, the power level can be reduced, allowing conservation of battery energy in each of the observation devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

References to software, instruction code, and similar terms are to be understood exclusively as being embodied in the physical configuration of storage media or other information processing hardware and circuits, and not as referring to the ideas implemented by the software. Accordingly, the execution of software refers to the reconfiguration of such media and circuitry so as to provide outputs in electrical form to other circuitry and media, and upon receiving electrical input from other circuitry and media, in accordance with design of the software and the operation of the processing hardware, and the methods and functions described and claimed herein are to be understood as referring exclusively to the operation of such hardware and related circuitry, and other physical structure as necessary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A remotely deployed two way audio communication system, comprising:
   a plurality of observation devices deployed in, and distributed in a region, each observation device including a wireless local area transceiver, an audio processor coupled to the wireless local area transceiver, and a microphone and a speaker that are each coupled to the audio processor, wherein each of the plurality of observation devices are acoustically calibrated for audio magnitude and audio phase with respect to each other, and wherein the observation devices form a wireless mesh network where each observation device communicates in the wireless mesh network using its respective wireless local area transceiver; and
   a gateway device co-located in the region with the plurality of observation devices, and having a wireless local area transceiver that communicates with the plurality of observation devices through the wireless mesh network, and further including a wireless wide area transceiver in communication with a wide area station located remotely from the region, wherein the gateway device communicates audio signals received from the observation devices to the wide area station, and from the wide area station via the wireless wide area transceiver to the plurality of observation devices via the wireless mesh network to be played by at least some of the observation devices to acoustically combine additively at a selected location in the region.

2. The remotely deployed two way audio communication system of claim 1, further comprising a command console remotely located from the region and in communication with the wide area station through a network, wherein the audio signals from the plurality of observation devices are routed to the command console, and wherein the audio signals communicated to the observation devices are initially provided at the command console.

3. The remotely deployed two way audio communication system of claim 2, wherein each of the plurality of observation devices further includes a camera system that produces image data, a location determination system that produces location data indicating a location of the respective observation device, and an orientation determination system that produces orientation data indicating an orientation of the respective observation device, wherein the respective image data, location data, and orientation data of each observation device is transmitted to the gateway device.

4. The remotely deployed two way audio communication system of claim 3, wherein the gateway device transmits the image data, location data, and orientation data of the plurality of observation devices to the command console, and wherein the command console uses the image data, location data, and orientation data to generate a virtual representation of the region and to produce a navigable rendering of the virtual representation of the region.

5. The remotely deployed two way audio communication system of claim 2, wherein, responsive to an indication of a location within the region at the command console, an audio signal provided at the command console is transmitted to via the gateway device to at least some of the plurality of observation devices such that the at least some of the observation devices play the audio signal based on their calibration with respect to each other to additively combine at the location in the region.

6. The remotely deployed two way audio communication system of claim 1, wherein each of the plurality of observation devices are substantially spherically shaped and weighted to bias each respective observation device into an upright orientation.

7. The remotely deployed two way audio communication system of claim 3, wherein the plurality of observation devices, gateway device, and command console operate to provide two way audio communication between a person at the command console and a person in the region in the vicinity of at least some of the observation devices, wherein audio signals provided by the person at the command console are played over the speaker of each of the at least some observation devices, and audio provided by the person in the region is received at a microphone of at least one of the observation devices and transmitted to the command console via the gateway device.

8. The remotely deployed two way audio system of claim 7, wherein a location of the person in the region is determined based on receiving the audio signals provided by the person in the region at several of the plurality of observation devices and based on the audio calibration of the observation devices with respect to each other.

9. A method of operating a two way audio system, comprising:
    deploying a plurality of observation devices in a region, each observation device including an audio processor coupled to a microphone and a speaker;
    calibrating the acoustic differences of the plurality of observation devices with respect to each other;
    forming a wireless local area network among the observation devices and a gateway device, where each observation device is a peer in the wireless local area network;
    transmitting audio signals received at the observation devices through the local wireless network to the gateway device and from the gateway device through a wide area network to a remotely located command console;
    receiving audio signals originated at the command console at some of the plurality of observation devices via the gateway device through the wireless local area network; and
    the some of the plurality of observation devices playing the received audio signals, wherein each of the observation devices playing the audio signals playing the audio signals at a phase and magnitude to combine additively at a location in the region based on the calibrated acoustic differences of the plurality of observation devices.

10. The method of claim 9, further comprising, subsequent to calibrating the acoustic differences, each of the plurality of observations devices transmits its acoustic calibration information to the gateway device.

11. The method of claim 9, wherein calibrating the acoustic differences comprises:
    each of the plurality of observation devices, in series, playing a calibration sound at a selected time and magnitude; and
    the observation devices that are not playing the calibration sound determining magnitude and phase equalization parameters upon receiving the calibration sound.

12. The method of claim 11, wherein playing a calibration sound comprises playing an ultrasonic calibration sound.

13. The method of claim 9, wherein each of the plurality of observation devices further includes a camera system that produces image data, a location determination system that produces location data indicating a location of the observation device, and an orientation system that produces orientation data that indicates an orientation of the observation device, the method further comprises:
    each of the plurality of observation devices transmitting its respective image data, location data, and orientation data through the local wireless network to the gateway device and from the gateway device through a wide area network to a remotely located command console;
    rendering a virtual representation of the region at the command console based on the image, location, and orientation data provided by each of the plurality of observation devices; and
    indicating the selected location in the region in the rendered virtual representation.

14. The method of claim 13, wherein indicating the selected location is performed in response to receiving an input corresponding to the selected location in the rendered virtual representation.

15. The method of claim 13, wherein indicating the selected location is performed in response to determining a location of a source sound received at several of the observation devices, based on calibrating the acoustic differences of the plurality of observation devices with respect to each other.

16. The method of claim 9, wherein forming the wireless local area network among the observation devices and the gateway device comprises forming a wireless mesh network among the observation devices and the gateway device.

17. A method of operating a remotely deployed two way audio communication system, comprising:
    providing, at a command console of the two way audio communication system, an input corresponding to a selected location in a region that is remote from the command console;
    providing, at the command console, in association with the input, audio signals;
    transmitting the audio signals to a plurality of observation devices distributed throughout the region; and
    playing the audio signals by the plurality of observation devices where each observation device plays the audio signals to produce a respective acoustic signal at a respective delay such that respective acoustic signals of the plurality of observation devices additively combine together at the selected location in the region based on an audio calibration of each observation device with respect each other observation device.

18. The method of claim 17, wherein transmitting the audio signals comprises:
    transmitting the audio signals from the command console to a gateway device located in the region via a wide area network; and transmitting the audio signals from the gateway device to each of the plurality of observation devices via a wireless local area network.

19. The method of claim 18, wherein transmitting the audio signals from the gateway device to each of the plurality of observation devices via the wireless local area network comprises transmitting the audio signals from the gateway device to each of the plurality of observation devices via a wireless mesh network that relays the audio signals wirelessly among the observation devices and where each observation device operates as a peer node in the wireless mesh network.

20. The method of claim 17, further comprising:
receiving, at the command console, panoramic image date from each of the plurality of observation devices;
generating, at the command console, a virtual representation of the region; and
rendering the virtual representation in a graphically navigable interface at the command console;
wherein providing the input corresponding to the selected location in the region comprises receiving the input in the navigable interface.

* * * * *